(12) United States Patent  
Lopez et al.

(10) Patent No.: US 11,136,493 B2  
(45) Date of Patent: Oct. 5, 2021

(54) FRICTION-REDUCING COMPOSITIONS FORMULATED WITH HIGHLY CONCENTRATED BRINE

(71) Applicant: ChampionX USA Inc., Sugarland, TX (US)

(72) Inventors: Analette I. Lopez, Missouri City, TX (US); Kin-Tai Chang, Sugar Land, TX (US); Pious Kurian, Sugar Land, TX (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 15/343,413

(22) Filed: Nov. 4, 2016

(65) Prior Publication Data

US 2017/0121590 A1    May 4, 2017

Related U.S. Application Data

(60) Provisional application No. 62/250,594, filed on Nov. 4, 2015.

(51) Int. Cl.
*C09K 8/68* (2006.01)
*C09K 8/035* (2006.01)
*C09K 8/88* (2006.01)

(52) U.S. Cl.
CPC ............. *C09K 8/68* (2013.01); *C09K 8/035* (2013.01); *C09K 8/88* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 4,644,020 | A | 2/1987 | Stahl |
| 4,895,663 | A | 1/1990 | Chen |
| 4,906,701 | A | 3/1990 | Clark, Jr. |
| 4,929,655 | A | 5/1990 | Takeda et al. |
| 5,006,590 | A | 4/1991 | Takeda et al. |
| 5,597,858 | A | 1/1997 | Ramesh et al. |
| 5,597,859 | A | 1/1997 | Hurlock et al. |

(Continued)

FOREIGN PATENT DOCUMENTS

| | | |
|---|---|---|
| EP | 0095730 A2 | 12/1983 |
| GB | 1 489 046 | 10/1977 |

(Continued)

OTHER PUBLICATIONS

Zelenev, Andrei S. et al., Fast-Inverting, Brine and Additive-tolerant Friction Reducer for Well Stimulation, SPE International Symposium on Oilfield Chemistry, The Woodlands, Texas USA, Apr. 20-22, 2009, 11 pages.

(Continued)

*Primary Examiner* — Jeffrey D Washville
(74) *Attorney, Agent, or Firm* — Stinson LLP

(57) ABSTRACT

The present invention generally relates to methods and friction-reducers for decreasing the friction of a fluid. More specifically, the method comprises contacting a friction-reducer to reduce the friction of a fluid flowing in a conduit. The friction-reducer comprises an emulsion polymer, comprising polyanion, polycation, and polynonionic monomers, and a highly concentrated salt solution.

20 Claims, 3 Drawing Sheets

(56) References Cited

U.S. PATENT DOCUMENTS

| | | |
|---|---|---|
| 5,605,970 A | 2/1997 | Selvarajan |
| 5,837,776 A | 11/1998 | Selvarajan et al. |
| 5,985,992 A | 11/1999 | Chen |
| 6,171,505 B1 | 1/2001 | Maury et al. |
| 6,265,477 B1 | 7/2001 | Hurlock |
| 6,605,674 B1 | 8/2003 | Whipple et al. |
| 6,686,417 B1 | 2/2004 | Reekmans et al. |
| 6,787,506 B2 | 9/2004 | Blair et al. |
| 7,429,625 B2 | 9/2008 | Harrington et al. |
| 7,776,958 B2 | 8/2010 | Strominger et al. |
| 7,902,127 B2 | 3/2011 | Kurian et al. |
| 9,034,804 B2 | 5/2015 | Rey et al. |
| 2012/0196776 A1* | 8/2012 | Gupta ............ C09K 8/24 507/222 |
| 2013/0324443 A1* | 12/2013 | Wang ............ C04B 24/163 507/121 |
| 2014/0051620 A1* | 2/2014 | Soane ............ C09K 8/36 508/471 |

FOREIGN PATENT DOCUMENTS

| | | |
|---|---|---|
| WO | 2005/090503 A1 | 9/2005 |
| WO | 2012/061147 A1 | 5/2012 |
| WO | 2013/119759 A1 | 8/2013 |
| WO | 2013/162902 A1 | 10/2013 |

OTHER PUBLICATIONS

International Search Report dated Feb. 13, 2017 relating to PCT Patent Application No. PCT/US2016/060578, 7 pages.

Written Opinion dated Feb. 13, 2017 relating to PCT Patent Application No. PCT/US2016/060578, 6 pages.

Ferguson, Marcelle L. et al., Innovative Friction Reducer Provides Improved Performance and Greater Flexibility in Recycling Highly Mineralized Produced Brines, SPE 164535 (2013), Society of Petroleum Engineers, 11 pages.

Paktinat, Javad et al., Case Studies: Improved Performance of High Brine Friction Reducers in Fracturing Shale Reserviors, SPE 148794 (2011), Society of Petroleum Engineers, 12 pages.

* cited by examiner

FRICTION-REDUCING COMPOSITIONS FORMULATED WITH HIGHLY CONCENTRATED BRINE

CROSS-REFERENCE TO RELATED APPLICATION

This application claims priority to U.S. Provisional Patent Application Ser. No. 62/250,594 filed on Nov. 4, 2015, the disclosure of which is incorporated herein by reference in its entirety.

FIELD OF THE INVENTION

The present invention generally relates to methods and friction-reducing compositions for reducing the friction or drag of a liquid in a conduit. The friction-reducing compositions comprise an inverse polymer emulsion and a highly concentrated salt solution.

BACKGROUND OF THE INVENTION

In a well stimulation operation, a large amount of fracturing fluid is pumped down a well bore hole under high pressure and at high flow rates to a depth of about 500 meters to 6 kilometers or more, causing the rock formation surrounding the well bore to fracture, allowing the oil to seep through the fractures into the well bore where it is pumped to the surface.

The turbulence produced as the fracturing fluid is pumped through the pipe under pressure results in a drag force and pressure loss, thereby increasing the amount of energy required to move the amount of fluid at the same speed. This drag and pressure loss is often called "friction" in a fracturing operation.

Generally, high molecular weight linear polymers are used to alter the rheological properties of the fluid so that the turbulent flow is minimized, thereby preventing consequent energy loss in the fluid as it is pumped through the pipe. A good friction reducer will cause a large decrease in pressure loss at small concentrations, will be inexpensive, and will have high shear, temperature and pressure stability.

Water-soluble polymers such as polyacrylamide and various copolymers can be used as mobility control polymers within the oil and gas industry and as flocculants within the oil and gas, waste water treatment, food and beverage, papermaking, and mining industries. Further, these polymers have been shown to improve sweep efficiency, within the oil industry, by increasing the viscosity of the aqueous flooding fluid and decrease pumping pressure losses in hydraulic fracturing by reducing turbulence. These polymers are generally prepared as emulsions because handling of these polymers in the dry, powdered form can be difficult.

Water-in-oil or inverse emulsion polymers are typically used because of their ease of handling, ability to prepare the polymers at high concentrations, and lower viscosity as compared to solution polymers of the same concentration. In order to make the polymers available to perform as friction reducers, the internal polymer phase must first be exposed to a bulk water or brine solution. To optimize the effectiveness, therefore, it is advantageous for the polymer to be released quickly into the bulk continuous aqueous phase and fully hydrate.

The processes involved with full hydration follows the sequence of: initial emulsion inversion to a water continuous phase, polymer chain hydration, dissolution, uncoiling, and disentanglement. However, it may be difficult for inverse emulsion product formulations to embody all of these properties, especially rapid emulsion inversion. The primary reason for this difficulty is that the surfactants used to form the inverse emulsions during polymer preparation tend to make the resulting inverse polymer emulsion highly stable. Thus, the very design principles that are advantageous for polymer preparation can make the inverse polymer emulsion naturally resistant to the initial inversion when the product is added to bulk water.

The conventional way to rapidly hydrate an inverse emulsion polymer is by adding high hydrophilic-lipophilic balance (HLB) surfactants that emulsify the continuous oil phase and expose the polymer particle to aqueous solution once the polymer emulsion is added into bulk water. However, the use of high HLB surfactants may also negatively influence the overall emulsion system and possibly destabilize the product formulation. Multiple factors including physical properties and identity of the polymer, surfactants, temperature, and the salinity of water in which the polymer is to hydrate/dissolve have an effect on the hydration process. Thus, each formulation needs to be optimized to achieve the desired performance, which can be time-consuming and tedious. When conditions for hydration are not optimal, the performance of the inverse polymer emulsion is reduced.

Therefore, a need exists to develop novel friction-reducing inverse polymer emulsions with good friction reduction performance that do not contain high HLB surfactants.

SUMMARY OF THE INVENTION

One aspect of the invention is directed to a friction-reducing composition comprising an inverse polymer emulsion and a highly concentrated salt solution. The composition has a better friction or drag reduction performance than an otherwise identical composition not comprising a highly concentrated salt solution and the weight ratio of the highly concentrated salt solution to the inverse polymer emulsion is from about 0.5:1 to about 10:1.

Another aspect is a friction-reducing composition as described herein that can be a ready to use composition.

A further aspect of the invention is a method of reducing the friction of a fluid flowing in a conduit comprising contacting an effective amount of a friction-reducing composition described herein with the fluid whereby the friction of the fluid flowing in the conduit is reduced.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
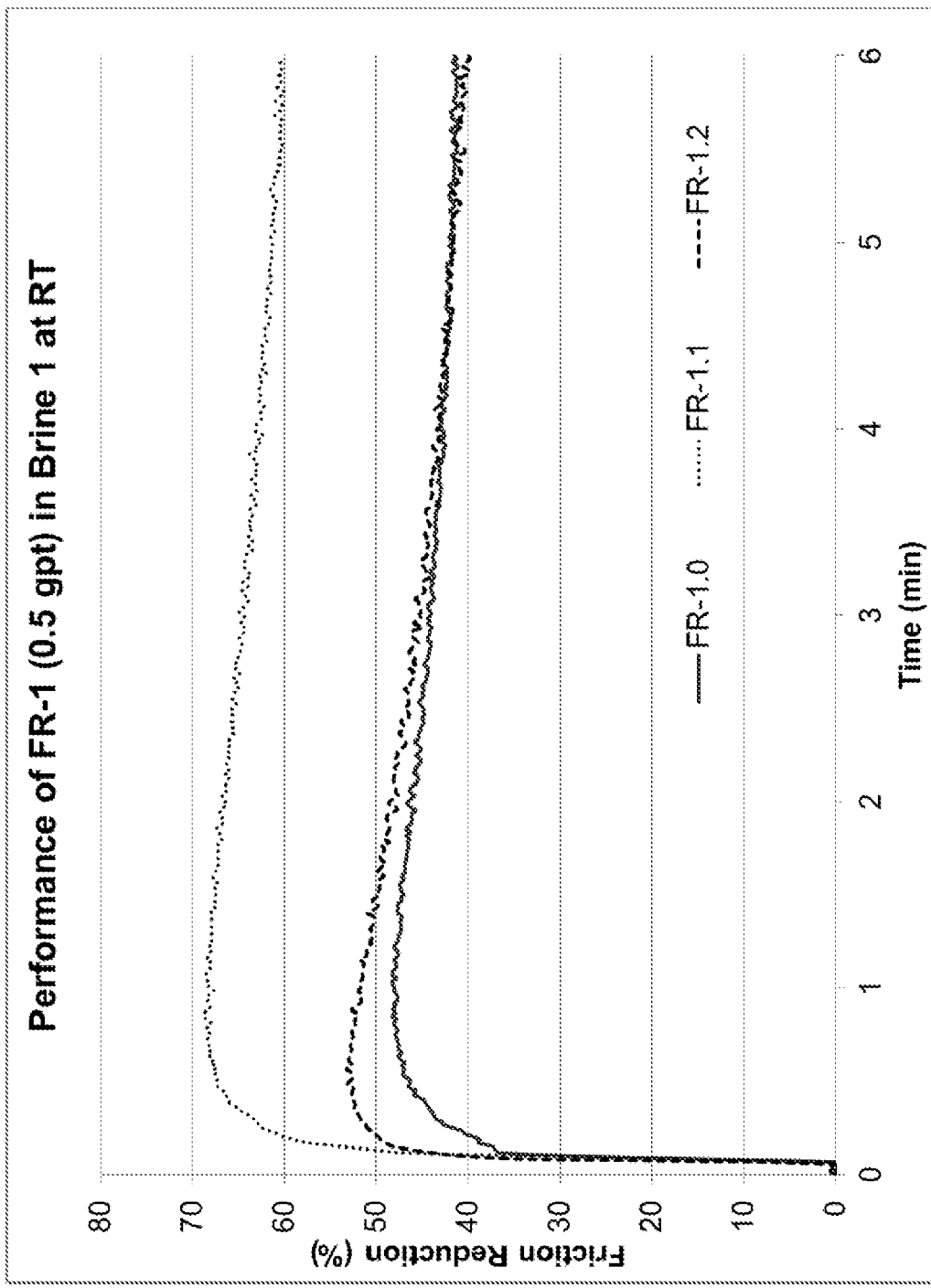
FIG. 1 is a graph of the percent friction reduction versus time for FR-1.0, FR-1.1 and FR-1.2 in brine 1 at room temperature. FR-1.0 is a standard inverse emulsion polymer, FR-1.1 was modified by the addition of highly concentrated NaCl solution to FR-1.0, and FR-1.2 was likewise modified by the addition of highly concentrated NH$_4$OAc solution.

The instant invention is directed to a friction-reducing composition comprising an inverse polymer emulsion and a highly concentrated salt solution that provides improved friction reducing properties as compared to the same inverse polymer emulsion without the highly concentrated salts solution. The weight ratio of the highly concentrated salt solution to the inverse polymer emulsion is from about 1:1 to about 10:1.

The inverse polymer emulsion concentration in the friction-reducing composition is from about 10 wt. % to about 60 wt. %, from about 10 wt. % to about 45 wt. %, from about 10 wt. % to about 40 wt. %, from about 10 wt. % to about 30 wt. %, from about 15 wt. % to about 60 wt. %, from about 20 wt. % to about 60 wt. %, from about 25 wt. % to about 60 wt. %, from about 30 wt. % to about 60 wt. %, from about 25 wt. % to about 35 wt. %, or from about 30 wt. % to about 35 wt. %.

The friction-reducing composition can further comprise a polymer dispersion or dispersion polymer. A polymer dispersion is a dispersion of dry polymer particles in an organic solvent. An example of such product is LIQUID HE® 150 Polymer marketed by Drilling Specialties, a division of Chevron Phillips Chemical Company.

The friction-reducing composition can further comprise a viscosity modifier.

The viscosity modifier can comprise a non-water miscible organic material or solvent. Examples of these viscosity modifiers are paraffin oil, kerosene, diesel, heavy naphtha, an animal-derived fat, an animal-derived oil, a vegetable-derived fat, a vegetable-derived oil, limonene, pine oil, a surfactant, or a combination thereof.

The viscosity modifier can be an organic solvent.

The viscosity modifier can be a paraffin oil.

The viscosity modifier can have a concentration from about 2 wt. % to about 40 wt. % based on the total weight of the friction-reducing composition.

The viscosity modifier can have a concentration from about 10 wt. % to about 35 wt. % based on the total weight of the friction-reducing composition.

The polymer in the polymer emulsion can be a polymer capable of reducing the friction pressure of a moving aqueous fluid in a system. This polymer can also be referred to as a friction-reducing polymer.

The friction-reducing polymer can be derived from an anionic monomer, a cationic monomer, a nonionic monomer, a zwitter ionic monomer, or a combination thereof.

The anionic monomer can comprise acrylic acid or salt thereof, methacrylic acid or salt thereof, itaconic acid or a salt thereof, acrylamidoglycolic acid or a salt thereof, 3-allyloxy-2-hydroxy-1-propanesulfonic acid, vinylsulfonic acid or a salt thereof, 2-acrylamido-2-methylpropane sulfonic acid or salt thereof, dialkyl aminoethyl acrylate, styrene sulfonic acid or salt thereof, 2-acrylamido-2-methylpropane phosphonic acid or salt thereof, or a combination thereof.

The anionic monomer can comprise acrylic acid or salt thereof, methacrylic acid or salt thereof, 2-acrylamido-2-methylpropane sulfonic acid or salt thereof, or a combination thereof.

The cationic monomer can comprise a diallyldialkylammonium halide, an acrylate of a dialkylaminoalkyl compound, an alkyl acrylate of a dialkylaminoalkyl compound, a N,N-dialkylaminoalkylacrylamide, a N,N-dialkylaminoalkyl(meth)acrylamide, or a combination thereof.

The cationic monomer can comprise a N,N-dimethyl-aminoethyl-acrylate methyl chloride quaternary salt (DMAEA-MCQ), a N,N-dimethyl-aminoethyl-methacrylate methyl chloride quaternary salt (DMAEM-MCQ), a diallyl-dimethyl-ammonium chloride (DADMAC), a N,N-dimethylaminoethyl acrylate or a quaternized salt thereof, a N,N-dimethylaminoethyl methacrylate or a quaternized salt thereof, a N,N-dimethylaminopropyl acrylamide or a quaternized salt thereof, a N,N-dimethylaminopropyl methacrylamide or a quaternized salt thereof, a N,N-dimethyldiallylammonium chloride, or a combination thereof.

The nonionic monomer can comprise an acrylamide; a methacrylamide; an N-alkylacrylamide, such as N-methylacrylamide; a N,N-dialkylacrylamide, such as N,N-dimethylacrylamide; a methyl acrylate; a methyl methacrylate; an acrylonitrile; a N-vinyl methylacetamide; a N-vinylformamide; a N-vinyl methylformamide; a vinyl acetate; acrolein; a N-vinyl pyrrolidone; a N,N-diallylamine; a hydroxyalky (meth) acrylate, such as hydroxyethyl)meth)acrylate or a hydroxypropyl(meth)acrylate, or a combination thereof.

The zwitterionic monomer can comprise a betaine- or a sultaine-containing monomer. For example, the betaine- or sultaine-containing monomer can be N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)-ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl) ammonium betaine, or a combination thereof. Preferably, the betaine-containing monomer is N,N-dimethyl-N-methacryloyloxyethyl-N-(3-sulfopropyl)-ammonium betaine.

The nonionic monomer can comprise an acrylamide, a methacrylamide, or a combination thereof.

The highly concentrated salt solution can comprise a sodium ion, a potassium ion, a calcium ion, an ammonium ion, an alkyl-substituted ammonium ion, a magnesium ion, an aluminum ion, a lithium ion, or a combination thereof.

The highly concentrated salt solution can comprise a chloride ion, a bromide ion, an iodide ion, a nitrate ion, a perchlorate ion, an acetate ion, a sulfate ion, an oxalate ion, a phosphate ion, a formate ion, a carboxylate ion, a di-carboxylate ion, a polycarboxylate ion, or a combination thereof.

The highly concentrated salt solution can comprise sodium chloride, potassium chloride, ammonium chloride, ammonium acetate, or a combination thereof.

The highly concentrated salt solution can comprise sodium chloride, ammonium acetate, or a combination thereof.

When the highly concentrated salt solution comprises sodium chloride and ammonium acetate, the weight ratio of sodium chloride to ammonium acetate can be from about 1:5 to about 5:1, from about 1:4 to about 5:1, from about 1:3 to about 5:1, from about 1:2 to about 5:1, from about 1:1 to about 5:1, 1:5 to about 4:1, from about 1:4 to about 4:1, from about 1:3 to about 4:1, from about 1:2 to about 4:1, from about 1:1 to about 4:1, 1:5 to about 3:1, from about 1:4 to about 3:1, from about 1:3 to about 3:1, from about 1:2 to about 3:1, or from about 1:1 to about 3:1.

The weight ratio of the highly concentrated salt solution to the inverse polymer emulsion can be from about 0.5:1 to about 10:1, from about 0.5:1 to about 8:1, from about 0.5:1 to about 6:1, from about 1:1 to about 10:1, from about 1:1 to about 8:1, from about 1:1 to about 6:1, from about 1:1 to about 5:1, from about 2:1 to about 10:1, from about 2:1 to about 9:1, from about 2:1 to about 8:1, from about 2:1 to about 7:1, or from about 2:1 to about 6:1.

The friction-reducing composition can be a ready to use composition. The ready to use composition can comprise from about 10 wt. % to about 40 wt. % of an inverse polymer emulsion containing a friction-reducing polymer and from about 40 wt. % to about 90 wt. % of a highly concentrated salt solution based on the total weight of the polymer emulsion and the concentrated salt solution. The polymer emulsions and highly concentrated salt solutions described herein can be used in the ready to use composition.

The friction-reducing composition can be a ready to use composition. The ready to use composition can comprise from about 10 wt. % to about 40 wt. % of an inverse polymer emulsion containing a friction-reducing polymer and from about 40 wt. % to about 90 wt. % of a highly concentrated salt solution, wherein the weight ratio of the highly concentrated salt solution to the inverse polymer emulsion is from about 1:1 to about 10:1. The polymer emulsions and highly concentrated salt solutions described herein can be used in the ready to use composition.

The ready to use composition can comprise from about 10 wt. % to about 40 wt. % of an inverse polymer emulsion containing a friction-reducing polymer, from about 5 wt. % to about 20 wt. % of a viscosity modifier, and from about 40 wt. % to about 85 wt. % of a highly concentrated salt solution based on the total weight of the polymer emulsion, the viscosity modifier, and the concentrated salt solution. The inverse polymer emulsions and highly concentrated salt solutions described herein can be used in the ready to use composition.

The ready to use composition can comprise from about 10 wt. % to about 40 wt. % of an inverse polymer emulsion containing a friction-reducing polymer, from about 5 wt. % to about 20 wt. % of a viscosity modifier, and from about 40 wt. % to about 85 wt. % of a highly concentrated salt solution, wherein the weight ratio of the highly concentrated salt solution to the inverse polymer emulsion is from about 1:1 to about 10:1. The inverse polymer emulsions and highly concentrated salt solutions described herein can be used in the ready to use composition.

Another aspect of the present invention is directed to a method of reducing the friction of a fluid flowing in a conduit comprising contacting an effective amount of the friction-reducing composition with the fluid whereby the friction of the fluid flowing in the conduit is reduced.

The inverse emulsion polymer can have a weight-average molecular weight from about 100,000 Daltons to about 50,000,000 Daltons, from about 100,000 Daltons to about 40,000,000 Daltons, from about 100,000 Daltons to about 30,000,000 Daltons, from about 100,000 Daltons to about 20,000,000 Daltons, from about 100,000 Daltons to about 15,000,000 Daltons, from about 100,000 Daltons to about 10,000,000 Daltons. Preferably, the weight-average molecular weight is from about 100,000 Daltons to about 5,000,000 Daltons.

The inverse polymer emulsion can be prepared by a radical polymerization process. Preferably, the inverse emulsion polymer particle is prepared by an emulsion polymerization process.

In particular, inverse polymer emulsion can be prepared by emulsification of a water-soluble monomer in the oil phase, with subsequent polymerization, a process called inverse emulsion polymerization. In an inverse emulsion polymerization, a hydrophilic monomer or blend of monomers, frequently in aqueous solution, is emulsified in a continuous oil phase using water-in-oil emulsifiers and polymerized using either an oil-soluble or water-soluble initiator. A water-in-oil emulsion results, typically a viscous liquid formed from submicroscopic, water-containing, hydrophilic polymer particles suspended in the continuous oil phase.

The fluid can be an aqueous fluid and the friction-reducing composition is contacted with the liquid at a concentration from about 0.25 gallons per thousand gallons (gpt) to about 10 gpt, from about 0.25 gallons per thousand gallons (gpt) to about 9 gpt, from about 0.25 gallons per thousand gallons (gpt) to about 8 gpt, from about 0.25 gallons per thousand gallons (gpt) to about 7 gpt, from about 0.25 gallons per thousand gallons (gpt) to about 6 gpt, from about 0.25 gallons per thousand gallons (gpt) to about 5 gpt, from about 0.25 gallons per thousand gallons (gpt) to about 4 gpt, from about 0.25 gallons per thousand gallons (gpt) to about 3 gpt, from about 0.3 gallons per thousand gallons (gpt) to about 10 gpt, from about 0.3 gallons per thousand gallons (gpt) to about 8 gpt, from about 0.3 gallons per thousand gallons (gpt) to about 6 gpt, from about 0.3 gallons per thousand gallons (gpt) to about 4 gpt.

The friction-reducing composition can be contacted with the liquid at a concentration from about 0.3 to about 3 gpt.

A highly concentration salt solution is a salt solution at a concentration at which it will not destabilize the inverse polymer emulsion to which it is added. The concentration can have a concentration of greater than or equal to 65%, 70%, 75%, 80%, 85%, 90%, 95%, or 100% of the concentration at the salts's saturation concentration. At room temperature for a sodium chloride solution, the concentration of a highly concentrated sodium chloride salt solution is from about 25 wt. % to the saturation point for sodium chloride in water (i.e., about 37 wt. %).

The composition can further comprise one or more additional components, each component independently selected from the group consisting of a corrosion inhibitor, a solvent, an asphaltene inhibitor, a paraffin inhibitor, a scale inhibitor, an emulsifier, a water clarifier, a dispersant, an emulsion breaker, a gas hydrate inhibitor, a biocide, a pH modifier, a surfactant, or a combination thereof.

Suitable corrosion inhibitors for inclusion in the compositions include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable alkyl, hydroxyalkyl, alkylaryl arylalkyl or arylamine quaternary salts include those alkylaryl, arylalkyl and arylamine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. Further, $R^{5a}$, $R^{6a}$, $R^{7a}$, and $R^{8a}$ are each independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [N+R$^{5a}$R$^{6a}$R$^{7a}$R$^{8a}$][X−] wherein R$^{5a}$, R$^{6a}$, R$^{7a}$, and R$^{8a}$ contain one to 18 carbon atoms, and X is Cl, Br or I.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. Suitable quaternary ammonium compounds (quats) include, but are not limited to, trialkyl, dialkyl, dialkoxy alkyl, monoalkoxy, benzyl, and imidazolinium quaternary ammonium compounds, salts thereof, the like, and combinations thereof. The quaternary ammonium salt can be an alkylamine benzyl quaternary ammonium salt, a benzyl triethanolamine quaternary ammonium salt, or a benzyl dimethylaminoethanolamine quaternary ammonium salt.

The corrosion inhibitor can be a quaternary ammonium or alkyl pyridinium quaternary salt such as those represented by the general formula:

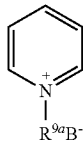

wherein R$^{9a}$ is an alkyl group, an aryl group, or an arylalkyl group, wherein said alkyl groups have from 1 to about 18 carbon atoms and B is Cl, Br or I. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium and an alkyl benzyl pyridinium chloride, preferably wherein the alkyl is a $C_1$-$C_6$ hydrocarbyl group. The corrosion inhibitor can include benzyl pyridinium chloride.

The corrosion inhibitor can be an imidazoline derived from a diamine, such as ethylene diamine (EDA), diethylene triamine (DETA), triethylene tetraamine (TETA) etc. and a long chain fatty acid such as tall oil fatty acid (TOFA). Suitable imidazolines include those of formula:

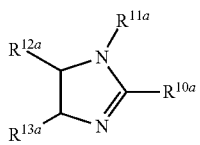

wherein R$^{12a}$ and R$^{13a}$ are independently a $C_1$-$C_6$ alkyl group or hydrogen, R$^{11a}$ is hydrogen, $C_1$-$C_6$ alkyl, $C_1$-$C_6$ hydroxyalkyl, or $C_1$-$C_6$ arylalkyl, and R$^{10a}$ is a $C_1$-$C_{20}$ alkyl or a $C_1$-$C_{20}$ alkoxyalkyl group. For the imidazolines, R$^{11a}$, R$^{12a}$ and R$^{13a}$ are each hydrogen and R$^{10a}$ is the alkyl mixture typical in tall oil fatty acid (TOFA).

The corrosion inhibitor compound can be an imidazolinium compound of the following formula:

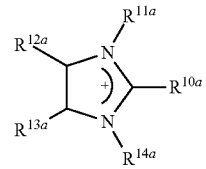

wherein R$^{12a}$ and R$^{13a}$ are independently a $C_1$-$C_6$ alkyl group or hydrogen, R$^{11a}$ and R$^{14a}$ are independently hydrogen, $C_1$-$C_6$ alkyl, $C_1$-$C_6$ hydroxyalkyl, or $C_1$-$C_6$ arylalkyl, and R$^{10}$ is a $C_1$-$C_{20}$ alkyl or a $C_1$-$C_{20}$ alkoxyalkyl group.

Suitable mono-, di- and trialkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethyl phosphate with triethylphosphate producing a more broad distribution of alkyl phosphate esters. Alternatively, the phosphate ester may be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor compound can further be a monomeric or oligomeric fatty acid. Preferred are $C_{14}$-$C_{22}$ saturated and unsaturated fatty acids as well as dimer, trimer and oligomer products obtained by polymerizing one or more of such fatty acids.

A composition of the invention can comprise from 0 to 80 percent, 0 to 60 percent, or 0 to 50 percent by weight of one or more corrosion inhibitors, based on total weight of the composition. A composition of the invention can comprise from 0 to 10 percent by weight of one or more additional corrosion inhibitors, based on total weight of the composition. A composition of the invention can comprise 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of one or more additional corrosion inhibitors, based on total weight of the composition. Each system can have its own requirements, and the weight percent of one or more additional corrosion inhibitors in the composition can vary with the system in which it is used.

The composition can further comprise an organic sulfur compound, such as a mercaptoalkyl alcohol, mercaptoacetic acid, thioglycolic acid, 3,3'-dithiodipropionic acid, thiosulfate, thiourea, L-cysteine, or tert-butyl mercaptan. Preferably, the mercaptoalkyl alcohol comprises 2-mercaptoethanol. The organic sulfur compound can constitute 0 to 15 wt. % of the composition, based on total weight of the composition, preferably about 1 to about 10 wt. % and more preferably about 1 to about 5 wt. %. The solvent stabilizer can constitute 1, 2, 3, 4, 5, 6, 7, 8, 9, 10, 11, 12, 13, 14 or 15 wt. % of the composition.

The composition can further include a demulsifier. Preferably, the demulsifier comprises an oxyalkylate polymer, such as a polyalkylene glycol. The demulsifier can constitute 0.5 to 5 wt. % of the composition, based on total weight of the composition. The demulsifier can constitute 0.5, 1, 1.5, 2, 2.5, 3, 3.5, 4, 4.5 or 5 wt. % of the composition.

Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

Suitable hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary amines and aldehydes, and condensation products of alkyl alcohols and aldehydes.

Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

Compositions made according to the invention can further include additional functional agents or additives that provide a beneficial property. For example, additional agents or additives can be selected from the group consisting of pH adjusters or other neutralizing agents, surfactants, emulsifiers, sequestrants, solubilizers, other lubricants, buffers, detergents, cleaning agent, rinse aid composition, secondary anti-corrosion agent, preservatives, binders, thickeners or other viscosity modifiers, processing aids, carriers, water-conditioning agents, foam inhibitors or foam generators, threshold agent or system, aesthetic enhancing agent (i.e., dye, odorant, perfume), other agents or additives suitable for formulation with a corrosion inhibitor composition and the like, and mixtures thereof. Additional agents or additives will vary according to the particular corrosion inhibitor composition being manufactured and its intend use.

Compositions made according to the invention can further include additional functional agents or additives that provide a beneficial property. Additional agents or additives will vary according to the particular composition being manufactured and its intended use as one skilled in the art will appreciate. The compositions may not contain any of the additional agents or additives.

An "inverse emulsion" refers to an aqueous (water) phase dispersed in a non-aqueous (organic or oil) phase, where the aqueous phase is the discontinuous phase and oil phase is the continuous phase. In inverse polymer emulsions, polymer molecules can be packed inside aqueous phase droplets that are emulsified in the oil phase. The (active polymers are tightly coiled within the water phase of the inverse polymer emulsions, but before the active polymer can be used, the inverse polymer emulsion must undergo inversion or hydration so that the polymer is released. The inverse polymer emulsion form of the polymers facilitates the handling, transport, and metering of the liquid active polymer into a process, and the inversion of these inverse polymer emulsions into bulk water or brine typically produces an aqueous solution that can be ready to use without excessive mixing or solution aging time.

"Zwitter ionic monomer" means a monomer containing cationically and anionically charged functionality in equal proportions, such that the monomer is net charge neutral overall.

Having described the invention in detail, it will be apparent that modifications and variations are possible without departing from the scope of the invention defined in the appended claims.

EXAMPLES

The following non-limiting examples are provided to further illustrate the present invention.

The following tests were conducted using an inverse emulsion polymer formulated with a paraffin oil and a highly concentrated salt solution.

The synthesis of the emulsion polymer compositions are described in Example 1, below. The formulations of various friction reducing compositions are described in Example 2, below.

Example 1: Synthesis of Emulsion Polymer Compositions

Two friction reducer end product series, labeled as FR-1.0 and FR-2.0 in Table 1, were prepared from acrylamide based copolymers. FR-1.0 was prepared from a 2-acrylamido-2-methylpropane sulfonic acid-acrylamide based inverse emulsion copolymer, with 28.2% polymer actives. FR-2.0 was prepared from an acrylate-acrylamide based inverse emulsion copolymer, with 23% polymer actives.

FR-1.0 was prepared by combining an acrylamide solution (39.7 g, 49.5% in water), 2-acrylamido-2-methylpropane sulfonic acid, sodium salt (14.8 g, 58% in water), ethylenediaminetetraacetic acid tetrasodium salt (0.17 g), sodium formate (0.002 g), sodium chloride (4.0 g), and DI water (14.3 g). The pH was adjusted to a value of 8 using sodium hydroxide (50% solution).

In a separate container, an oil phase was prepared by combining paraffin oil (22.8 g), SPAN 80 (1.1 g), and TWEEN 61 (0.9 g). The oil phase was transferred to a glass reactor equipped with a mechanical stirrer, a nitrogen sparger, and a thermometer.

The aqueous phase was added to the reactor while stirring at 1000 rpm. The mixture was purged with nitrogen for 30 minutes. Redox initiators comprising tert-butyl hydroperoxide (70% solution, 0.006 g in 0.130 g DI water), anhydrous sodium metabisulfite (0.003 g in 0.419 g DI water), and azobisisobutyronitrile (0.0001 g) were added to the mixture to initiate the reaction. After the reaction peak was reached, the temperature was raised to 70° C. and an additional amount of anhydrous sodium metabisulfite (0.01 g) was added to the mixture. After holding the temperature at 70° C. for an hour, the mixture was cooled to a temperature below 35° C.

A $C_{10}$-$C_{16}$ ethoxylated alcohol surfactant was then added to the reaction product and the mixture was stirred at 400 rpm for 30 minutes to produce an emulsion polymer product. The emulsion polymer product was filtered using a 100-mesh screen.

FR-2.0 was prepared in a similar fashion to FR-1.0 except acrylic acid was used instead of 2-acrylamido-2-methylpropane sulfonic acid, sodium salt.

Example 2: Preparation of Friction Reducing Compositions

Compositions comprising FR-1.0 and FR-2.0, as prepared in Example 1, were formulated with highly concentration salt solutions and a viscosity modifier, i.e., paraffin oil, to reduce the viscosity of the mixture and to improve the handling characteristics. The compositions are generally described in Table 1.

TABLE 1

Compositions of various friction reducers

| Composition | Components |
|---|---|
| FR-1.0 | 100% FR-1.0 |
| FR-1.1 | 35.6% (71.2 g) FR 1.0 + 11.7% (23.4 g) paraffin oil + 52.7% (105.4 g) NaCl (25 wt. %) |
| FR-1.2 | 35.6% (71.2 g) FR 1.0 + 11.7% (23.4 g) paraffin oil + 52.7% (105.4 g) NH$_4$OAc (58 wt. %) |
| FR-2.0 | 100% FR-2.0 |
| FR-2.1 | 21.7% (43.8 g) FR 2.0 + 14.3% (28.6 g) paraffin oil + 64.0% (128.0 g) NaCl (25 wt. %) |
| FR-2.2 | 21.7% (43.8 g) FR 2.0 + 14.3% (28.6 g) paraffin oil + 32.0% (64.0 g) NaCl (25 wt. %) + 32.0% (64.0 g) NH$_4$OAc (58 wt. %) |
| FR-2.3 | 21.7% (43.8 g) FR 2.0 + 14.3% (28.6 g) paraffin oil + 48.0% (96.0 g) NaCl (25 wt. %) + 16.0% (32.0 g) NH$_4$OAc (58 wt. %) |

Composition FR-1.1 was prepared by slowly adding paraffin oil to a beaker containing FR-1.0 while stirring at 800 rpm. The mixture was stirred for 30 minutes. A concentrated NaCl solution was then added slowly to the resulting mixture while stirring for another 60 minutes.

Compositions FR-1.2, FR-2.1, FR-2.2, and FR-2.3 where prepared in a similar fashion to FR-1.1, however, the amount of paraffin oil and identity and amount of a concentration salt solution were varied. The amounts and identities of the concentrated salt solution are described in Table 1.

Example 3: Friction Reduction Tests

Friction reducing compositions were prepared as set forth in Examples 1 and 2, above.

The effectiveness of the friction reducers were evaluated using a flow loop apparatus (commercially available from Chandler Engineering). The loop consist of a 15 gallon tank, equipped with an 1800 rpm mixer, from which fluid is pumped at a maximum flow rate of 12 gallons per minute through a series of tubing totaling 50 feet in length with a total capacity of 0.9 gallons. The first tubing is 25 feet in length with a 0.75 inch outer diameter and a 0.62 inch inner diameter. This tubing is connected to a 25 feet long, 0.50 inch outer diameter, 0.40 inch inner diameter stainless steel tubing. The differential pressure is measured by pressure transducers across a 10 foot long, 0.50 inch outer diameter, 0.402 inch inner diameter section of tubing called the test section. After the fluid flows through the test section, it is looped back into the tank. The test section has a Reynold's number of 63000.

Flow loop experiments were conducted by charging the blend tank on the apparatus with five gallons of testing fluid comprising the brines described in Table 2. The fluid was first circulated through the loop, at a flow rate of 8 gallons per minute, while the baseline pressure differential was established.

TABLE 2

Composition of Test Fluid Brines

| | Composition (salts in g added to 1 L of H$_2$O) |
|---|---|
| Brine 1 | 60 g NaCl |
| Brine 2 | 99.4 g NaCl, 1.0 g KCl, 23.9 g CaCl$_2$•2H$_2$O, 8.5 g MgCl$_2$•6H$_2$O, 1.3 g SrCl$_2$•2H$_2$O |

Once the baseline pressure was established, the friction reducing polymer was added, at either 0.5 or 1.0 gallons per 1000 gallons, to the blend tank at time zero (0 min, t$_0$). The pressure drop was measured across a straight section, measuring 4.83 feet in length, at one second intervals over the course of six minutes.

The friction reduction is calculated as follows:

% friction reduction=100×($P1-P2$)/$P1$.

P1 is the initial pressure drop and P2 is the pressure drop after the addition of the friction reducer.

The invertibility of the friction reducer is measured by the time it takes for the friction reducer to reach 90% of the highest value after the injection of the polymer into the fluid (to). The shorter this time, the better the invertibility.

Figure 2:
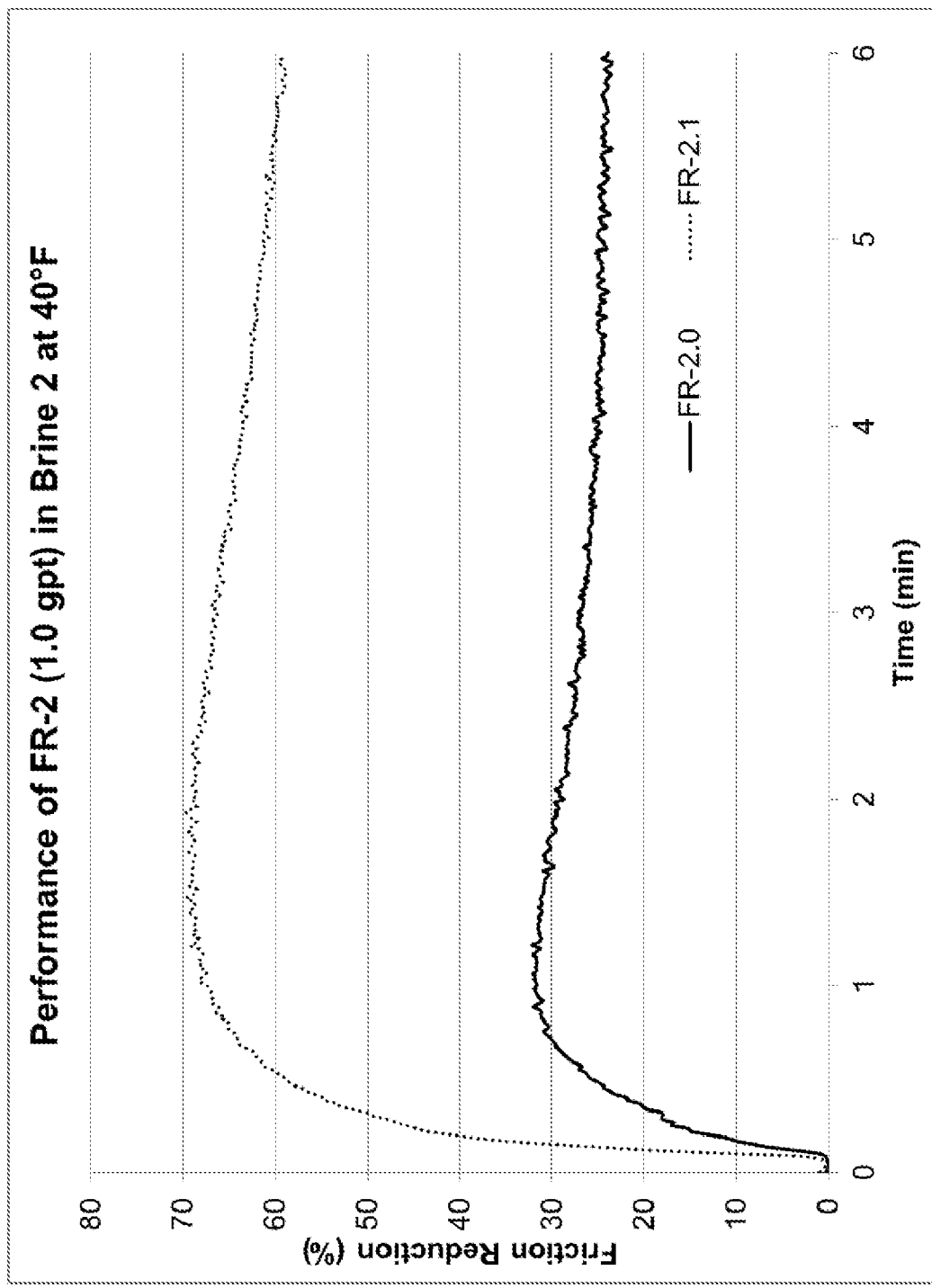
FIG. 2 is a graph of the percent friction reduction versus time for FR-2.0 and FR-2.1 in brine 2 at 40° F. FR-2.0 is the unmodified parent product and FR-2.1 was modified by the addition of highly concentrated NaCl solution.
Figure 3:
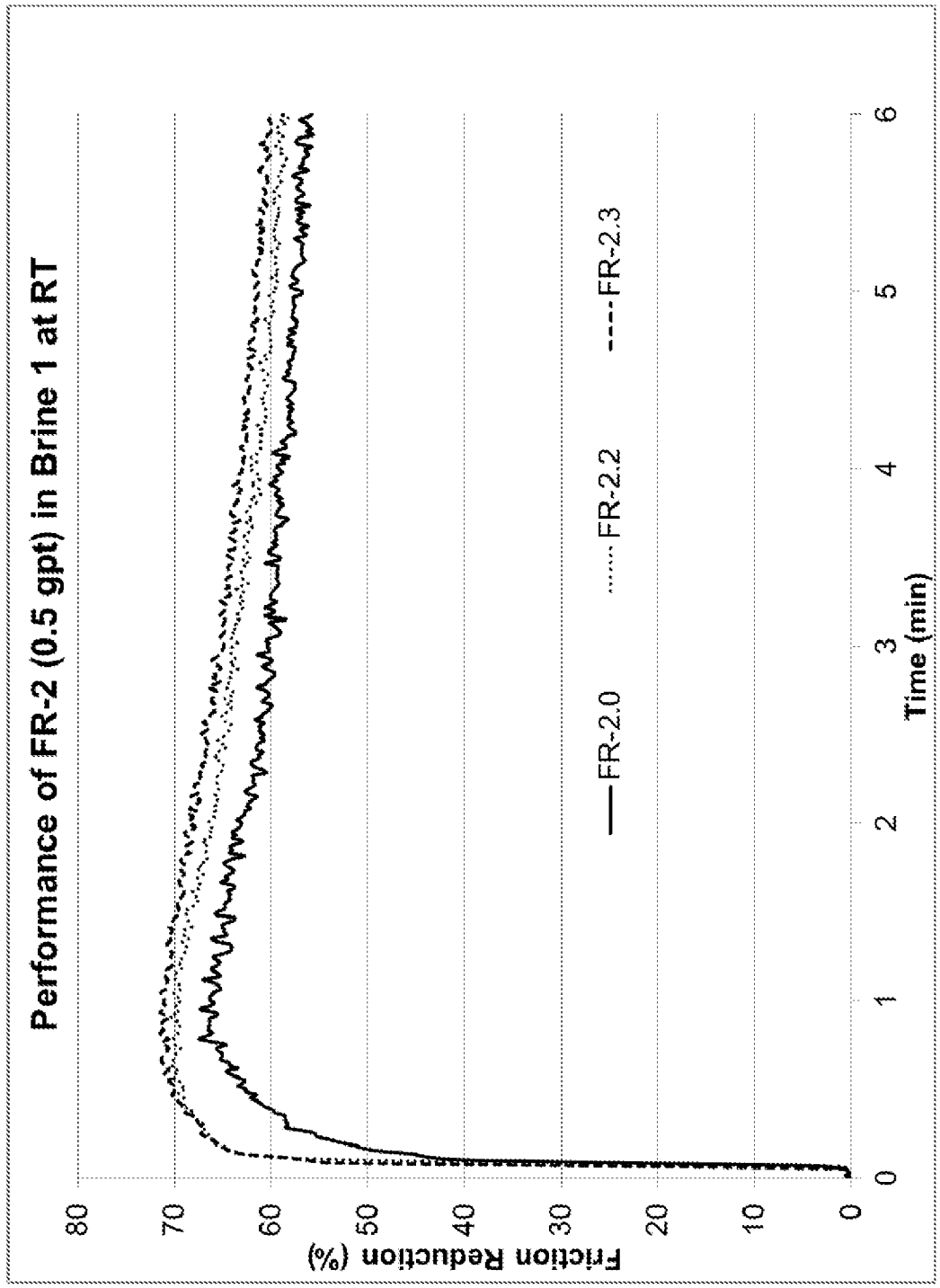
FIG. 3 is a graph of the percent friction reduction versus time for FR 2.0, FR-2.2 and FR-2.3 in brine 1 at room temperature. FR-2.2 and FR-2.3 were modified with mixture of salts. FR-2.2 was modified by the addition of a 1:1 ratio mixture of concentrated NaCl and NH$_4$OAc and FR-2.3 was modified by the addition of a 3:1 ratio mixture NaCl and NH$_4$OAc.

The results are visually depicted in FIGS. 1 through 3. The performance of FR-1.0 (2-acrylamido-2-methylpropane sulfonic acid-acrylamide-based polymer) shown in FIG. 1, was compared to the samples containing concentrated (i.e., 58 wt. % NaCl (FR-1.1) and NH$_4$OAc (FR-1.2) solutions). The FR-1.1 containing concentrated salt solution showed better performance in brine 1 at room temperature using the same concentration as FR-1.0 without the salt solution. The modification with highly concentrated brine essentially reduced the concentration of the active polymer by a third yet it maintained or increased the friction-reduction performance. The improvement in friction reduction performance depended on the type of salt solution used. In this particular example NaCl showed better performance than NH$_4$OAc.

In FIG. 2, the performance of FR-2.0 (acrylate-acrylamide-based polymer) was compared to the samples containing concentrated NaCl solution. The FR-2.1 containing concentrated NaCl solution showed better performance in brine 2, at 40° F. using the same loading of 1.0 gpt. The FR-2.1 with concentrated salt solution was about 20% the concentration of active polymer as FR-2.0 without a salt solution, but it showed better performance than the original product in friction reduction.

In FIG. 3, the performance of FR-2.0 (acrylate-acrylamide-based polymer), was compared to the samples containing mixtures of concentrated NaCl and NH$_4$OAc solutions in different ratios. The FR-2.2 containing the mixture of concentrated NaCl and NH$_4$OAc solutions showed better performance in brine 1, at room temperature using the same loading of 0.5 gpt. The FR-2.3 containing mixtures of concentrated salt solutions have about 20% of polymer actives of the FR-2.0 without the salt solution.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A friction-reducing composition comprising an inverse polymer emulsion and a highly concentrated salt solution, wherein the composition has a better friction or drag reduction performance than an otherwise identical composition not comprising a highly concentrated salt solution, wherein the weight ratio of the highly concentrated salt solution to the inverse polymer emulsion is from about 0.5:1 to about 10:1 based on the total weight of the highly concentrated salt solution and the inverse polymer emulsion; and the highly concentrated salt solution has a concentration of greater than or equal to 65% of the salt concentration at the salts' saturation concentration and wherein the inverse polymer emulsion comprises a friction-reducing polymer and is prepared by an inverse emulsion polymerization method.

2. The friction-reducing composition of claim 1 wherein the ratio of the highly concentrated salt solution to the inverse polymer emulsion is from about 1:1 to about 8:1.

3. The friction-reducing composition of claim 1, wherein the concentration of the friction-reducing polymer in the inverse polymer emulsion is from about 10 wt. % to about 60 wt. %.

4. The friction-reducing composition of claim 1, further comprising a dispersion polymer.

5. The friction-reducing composition of claim 4, further comprising a viscosity modifier.

6. The friction-reducing composition of claim 5, wherein the viscosity modifier comprises an organic solvent, wherein the organic solvent is paraffin oil, kerosene, diesel, heavy naptha, an animal-derived fat, an animal-derived oil, a vegetable-derived fat, a vegetable-derived oil, limonene, pine oil, a surfactant, or a combination thereof.

7. The friction-reducing composition of claim 6, wherein the organic solvent is a paraffin oil.

8. The friction-reducing composition of claim 6, wherein the viscosity modifier has a concentration from about 10 wt. % to about 30 wt. % based on the total weight of the friction-reducing composition.

9. The friction-reducing composition of claim 1, wherein the friction-reducing polymer is derived from an anionic monomer and the anionic monomer comprises acrylic acid or salt thereof, methacrylic acid or salt thereof, itaconic acid or a salt thereof, acrylamidoglycolic acid or a salt thereof, 3-allyloxy-2-hydroxy-1-propanesulfonic acid, vinylsulfonic acid or a salt thereof, 2-acrylamido-2-methylpropane sulfonic acid or salt thereof, dialkyl aminoethyl acrylate, styrene sulfonic acid or salt thereof, 2-acrylamido-2-methylpropane phosphonic acid or salt thereof, or a combination thereof.

10. The friction-reducing composition of claim 9, wherein the anionic monomer comprises acrylic acid or salt thereof, methacrylic acid or salt thereof, 2-acrylamido-2-methylpropane sulfonic acid or salt thereof, or a combination thereof.

11. The friction-reducing composition of claim 1, wherein the friction-reducing polymer is derived from a nonionic monomer and the nonionic monomer comprises acrylamide; methacrylamide; an N-alkylacrylamide, such as N-methylacrylamide; a N,N-dialkylacrylamide, such as N,N-dimethylacrylamide; methyl acrylate; methyl methacrylate; acrylonitrile; N-vinyl methylacetamide; N-vinylformamide; N-vinyl methylformamide; vinyl acetate; acrolein; N-vinyl pyrrolidone; N,N-diallylamine; a hydroxyalky(meth) acrylate, such as hydroxyethyl)meth)acrylate or hydroxypropyl (meth)acrylate; or a combination thereof.

12. The friction-reducing composition of claim 11, wherein the nonionic monomer comprises acrylamide, methacrylamide, or a combination thereof.

13. The friction-reducing composition of claim 1, wherein the highly concentrated salt solution comprises sodium chloride, potassium chloride, ammonium chloride, sodium acetate, potassium acetate, ammonium acetate, or a combination thereof.

14. The friction-reducing composition of claim 1, wherein the weight ratio of the highly concentrated salt solution to the inverse polymer emulsion is from about 1:1 to about 6:1.

15. A method of reducing the friction of a fluid flowing in a conduit comprising contacting an effective amount of the friction-reducing composition of claim 1 with the fluid whereby the friction of the fluid flowing in the conduit is reduced.

16. The friction-reducing composition of claim 14, wherein the highly concentrated salt solution comprises sodium chloride having a concentration of from 25 wt. % to 37 wt. %.

17. The friction-reducing composition of claim 1, comprising from about 10 wt. % to about 40 wt. % of the inverse polymer emulsion and from about 40 wt. % to about 90 wt. % of the highly concentrated salt solution based on the total weight of the polymer emulsion and the concentrated salt solution.

18. A ready to use friction-reducing composition comprising from about 10 wt. % to about 40 wt. % of an inverse polymer emulsion containing a friction-reducing polymer and from about 40 wt. % to about 90 wt. % of a highly concentrated salt solution, wherein the weight ratio of the highly concentrated salt solution to the inverse polymer emulsion is from about 0.5:1 to about 8:1 based on the total weight of the inverse polymer emulsion and the highly concentrated salt solution; and wherein the highly concentrated salt solution has a concentration of greater than or equal to 65% of the salt concentration at the salts' saturation concentration.

19. A ready to use friction-reducing composition comprising from about 10 wt. % to about 40 wt. % of an inverse polymer emulsion containing a friction-reducing polymer, from about 5 wt. % to about 20 wt. % of a viscosity modifier, and from about 40 wt. % to about 85 wt. % of a highly concentrated salt solution, wherein the weight ratio of the highly concentrated salt solution to the inverse polymer emulsion is from about 0.5:1 to about 8:1 based on the total weight of the inverse polymer emulsion and the highly concentrated salt solution; and wherein the highly concentrated salt solution has a concentration of greater than or equal to 65% of the salt concentration at the salts' saturation concentration.

20. The ready to use friction-reducing composition of claim 19, wherein the viscosity modifier comprises an organic solvent, wherein the organic solvent is paraffin oil, kerosene, diesel, heavy naptha, an animal-derived fat, an animal-derived oil, a vegetable-derived fat, a vegetable-derived oil, limonene, pine oil, a surfactant, or a combination thereof.

* * * * *